Jan. 27, 1959
C. P. LELITER
2,870,643
CLUTCH SHIFTING MECHANISM
Filed Oct. 10, 1956
2 Sheets-Sheet 1
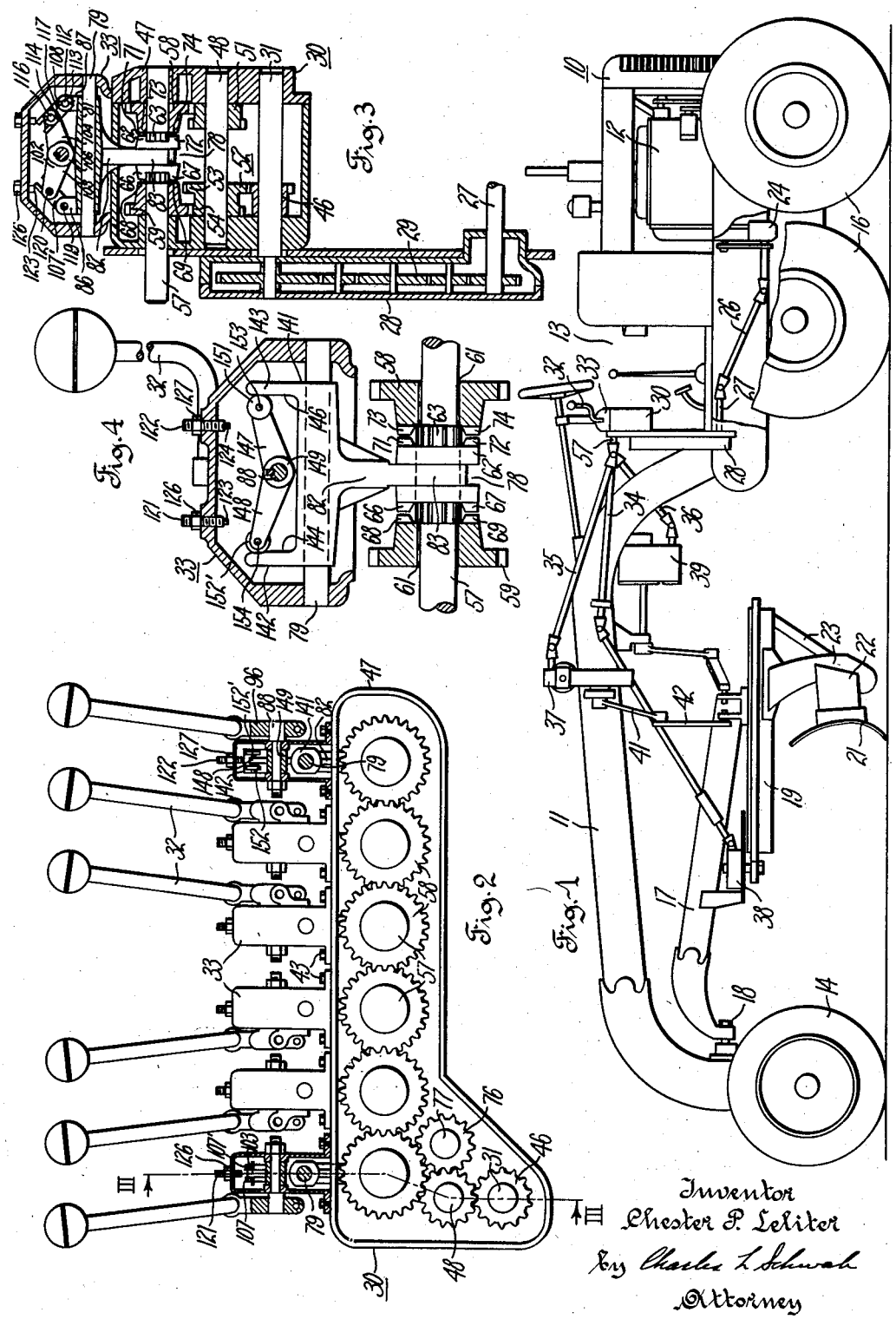
Inventor
Chester P. Leliter
By Charles L. Schwab
Attorney

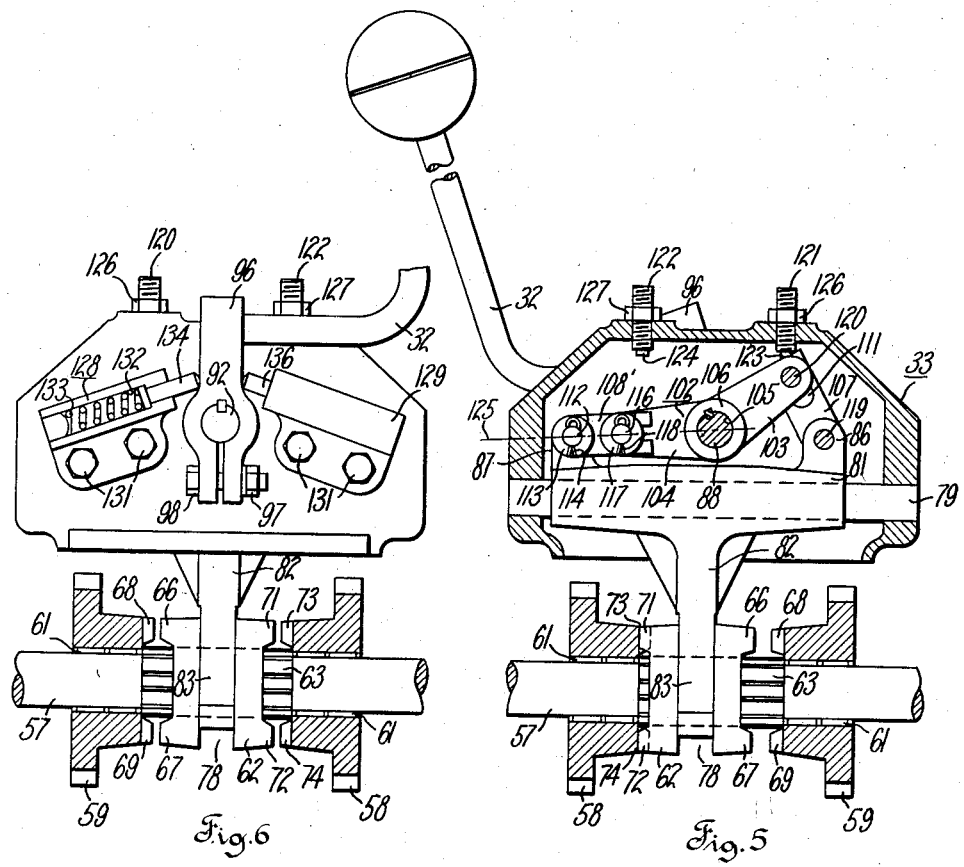
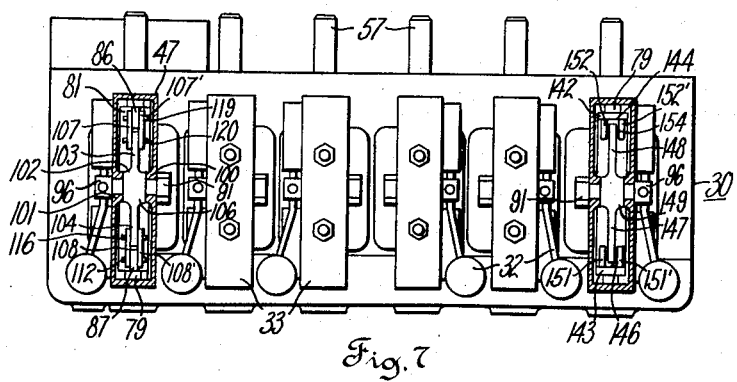

United States Patent Office 2,870,643
Patented Jan. 27, 1959

2,870,643

CLUTCH SHIFTING MECHANISM

Chester P. Leliter, Springfield, Ill., assignor to Allis-Chalmers Manufacturing Company, Milwaukee, Wis.

Application October 10, 1956, Serial No. 615,129

17 Claims. (Cl. 74—335)

This invention relates generally to a self-propelled earth working vehicle and is more particularly concerned with a power control device which transmits torque from the engine to mechanically adjustable mechanisms which are carried by the vehicle for controlling its functions.

Heretofore a self-propelled earth working vehicle, having the conventional mechanically operated power control device, was very difficult to operate. The conventional control device utilizes manually shifted tapered jaw clutches to establish and maintain engagement between the output shaft and either a forward or reverse gearing to transmit torque from the engine to the several adjustable mechanisms carried by the vehicle such as the circle turn, moldboard lift, scarifier, side shift, front wheel lean, etc. A tapered clutch jaw is used since it is easier to disengage than a straight jaw.

When operatively engaged, there is a substantial separating force between the tapered contact surfaces of the meshing clutch jaws which results from the axial component of the torsional force being transmitted and which must be resisted in order to maintain engagement. Since the clutch shifting linkage is actuated by a hand lever, resistance of the back thrust due to the separating force must be supplied by the operator's hand.

Before the clutch jaws are moved into engagement, one set of jaws is rotating at a constant velocity while the other set is stationary. As the jaws make contact, the resultant shock imposes a sudden torsional loading at the tapered contact surface causing the hand lever to kick back as the jaws resist engagement. Also during engagement, any one of the adjustable mechanisms may be subjected to a sudden resistance, such as would be caused by a tool engaging the ground, which also results in a shock loading causing the corresponding hand lever to kick back.

Considerable physical strength and endurance are required by the operator to resist the separating forces in order to maintain each of the several clutches of the control device in proper engagement. This is not only very tiring on the operator but the kick back of the hand lever may actually bruise his hands.

It is then an object of this invention to provide a vehicle of the type described with an improved power control device which will satisfactorily overcome the difficulties hereinbefore indicated.

A further object is to provide a vehicle of the type indicated with an improved manually actuated power control device wherein the machanical power is simply and efficiently transmitted from the engine to adjustable mechanisms which are carried by the vehicle for controlling its functions.

A further object is to provide a power control device of the type hereinbefore described with an improved clutch shifting structure having a linkage whereby a major portion of the thrust force emanating from the torque transmitting clutch elements during engagement will be effectively resisted by the support housing rather than by the operator's hand and arm.

A further object is to provide a manually actuated clutch shifting structure having a linkage for diverting the thrust force of the engaged clutch elements to the support housing with a means for regulating the amount of manual resistance which is required to prevent disengagement of the clutch.

Other and further objects and advantages of the invention will be apparent to those skilled in the art from the following detailed description when it is read in conjunction with the annexed drawings.

As shown in the drawings:

Fig. 1 is the side view of a self-propelled earth working vehicle or motor grader with an earth working tool attached thereto;

Fig. 2 shows an end view of the power control device with a part of the housing removed exposing the gearing for the six manually actuated control stations, two of the stations being partially sectioned to illustrate respectively two embodiments of the clutch shifting structure;

Fig. 3 shows a section view of the power control device and gear box taken along line III—III shown in Fig. 2 illustrating the various parts of the preferred embodiment of the clutch shifting structure disposed in a neutral position;

Fig. 4 shows a partially sectioned side view of a modification of the shifting structure for one of the control stations illustrating the various parts in the neutral position;

Fig. 5 shows a partially sectioned side view of a control station illustrating the various parts of the preferred embodiment of the clutch shifting structure disposed in the first near dead center position;

Fig. 6 shows a side view of a control station with a portion of the spring and plunger housing cut away; and Fig. 7 shows a top view of the power control device with a portion of the housing cut away at two of the control stations to show the top views respectively of the preferred embodiment and a modification of the clutch shifting linkage.

Referring to Fig. 1, a motor grader 10 has a main supporting frame 11 on which is carried a rear mounted engine 12, an operator station 13 intermediate the engine and front steerable wheels 14 and having traction wheels 16 which are suspended from the main frame 11 at opposite lateral sides of the vehicle adjacent the rear.

A moldboard drawbar 17 is attached at its front portion by a pivot connection 18 to the front part of the main frame 11 and on its rear portions to the circle member 19. A moldboard 21 is attached to the circle member 19 by suitable mounting structure 22 and braces 23. A power take-off 24 is connected in driven relation to the engine 12 and transmits torque through jointed shaft 26 to the input shaft 27 of a gear box 28 and thence through suitable change speed gearing 29 (Fig. 3) to input shaft 31 of the power control device 30. The power control device 30 includes a plurality of control stations 33 conventionally corresponding in number to the number of adjustable mechanisms carried by the vehicle. At the operator's station 13 by means of hand levers 32, at the several control stations 33, torque is selectively transmitted from the power control device 30 through the various jointed shafts 34, 35, 36 to the corresponding adjustable mechanisms 37, 38, 39. When torque is supplied to the moldboard lift 37 in one direction, the crank arm 41 will be rotated upward thereby imparting lift to a connecting link 42 causing the circle member 19 and moldboard 21 tobe raised. Conversely when torque is supplied in the opposite direction, crank arm 41 will be rotated downward and the circle member 19 will be lowered thereby bringing the moldboard 21 into engagement with the ground or other material that is being worked. Similar means are employed to operate the circle side shift 39, as well as a scarifier lift and a front wheel lean mechanism, not shown.

Referring now to Figs. 2, 3, 5 and 7, the forward and reverse gearing and clutch structure of the power control device are of conventional construction. The portions of the support housing 47 which encloses the several control stations 33 is secured to the main portion as by cap screws 43. The input shaft 31 having a gear 46 keyed thereon is journaled on suitable bearings in the support housing 47. In spaced relationship from input shaft 31 and journaled in suitable bearings in the housing 47 is a shaft 48 on which are keyed a gear 51 and a gear cluster 52 having a larger gear 53 and a smaller gear 54. Journaled on suitable bearings in the support housing 47 and in spaced relation to shaft 48 is the output shaft 57 on which are carried a reverse gear 58 and spaced therefrom a forward gear 59 both journaled on suitable bearings 61, respectively, for rotation with respect to the output shaft 57. Splines 63 are provided centrally on output shaft 57. A clutch member or collar 62 having a splined axially extending bore is slidably mounted on the splined portion of output shaft 57 for rotation therewith. At one end of the clutch collar 62 is a pair of equally spaced jaws or clutch surfaces 66, 67 which are complementary to the jaws or clutch faces 68, 69 provided on the forward gear; and at the opposite end of the collar is a second pair of equally spaced jaws or clutch surfaces 71, 72 in complementary relationship to the clutch faces 73, 74 presented by the reverse gear 58. All of the jaws or clutch surfaces and faces are tapered and are concentric and square with the splines 63. The forward gearing includes gear 46 which drives the large cluster gear 53, with which it is in constant mesh, thereby rotating shaft 48 oppositely with respect to the input shaft 31. The small cluster gear 54 drives the forward gear 59, with which it is in constant mesh, imparting rotation in the same direction as the input shaft 31. Since the forward gears 59 of each of the control stations 32 are in constant driving relation with the forward gear of the adjacent stations, alternate stations have forward gears rotating in the same direction.

The reverse gearing includes gear 51 which is rotating with shaft 48 in a direction opposite to input shaft 31, and is in driving relation to an idler gear 76 (Fig. 2). Gear 76 is rotatably journaled on a shaft 77 on the support housing 47 and is in constant mesh with both gear 51 and reverse gear 58 thereby rotating reverse gear 58 in the same direction as gear 51 which is opposite to the rotation of forward gear 59. The reverse gears 58 of control stations 33, respectively, are each in constant mesh with the reverse gear of the adjacent station as shown in Fig. 2, whereby the reverse gears of alternate stations are rotating in the same direction.

The clutch collar 62 is provided with a groove 78 which is located centrally and extends about its circumference. A guide bar 79 is in spaced relation and parallel to the output shaft 57 and is received, as by press fitting, into openings provided in the support housing 47. Carried on the guide bar 79 for reciprocating motion along the axis thereof is a clutch shifting member 81. Integral with the clutch shifting member 81 is means for shifting the collar 62 in the form of an arm 82 having a yoke 83 at the end thereof which is received into groove 78 of the collar member 62 and is operative to transmit thrust axially between the shifting member 81 and collar member 62. Also integral with the shifting member are spaced abutment portions 86, 87 at opposite ends thereof. A manually actuated control lever includes a pivot shaft 88, a crank arm 96 and hand lever 32, a link member 102 and link elements 107, 107' and 108, 108'. As best shown in Fig. 2, pivot shaft 88 is journaled in suitable bearings carried in aligned bore openings provided in the support housing 47 and presents a pivot axis normal to the axis of the guide bar 79. One end of the pivot shaft 88 is threaded and extends through the housing 47 to cooperate with an adjusting nut 91. The opposite end 92 of the pivot shaft 88 is of a larger diameter than the bore which receives the shaft, and protrudes from the housing 47 having a portion 93 in abutting relationship to the outside surface of the housing. A crank arm 96, as best shown in Fig. 6, is keyed on the large diameter end 92 for rotation therewith and is secured thereto by a nut 97 and a bolt 98. Attached to the crank arm 96 for pivoting the shaft 88 in opposite directions is a hand lever 33. A link member 102 is keyed on the pivot shaft 88 for pivotal movement therewith, intermediate bosses 100, 101 which are on opposite inside walls of the support housing 47. The link 102 presents a hub 106 provided with a transverse bore 105 through which the shaft 88 is piloted and a pair of arms 103, 104 extending radially from the bore 105 in confronting relationship, respectively, with abutment portions 86 and 87. Arms 103, 104 have a transverse bore, respectively, in the ends which is in proximity to the abutment portions 86 and 87.

For transmitting motion to the clutch shifting member 81, the arms 103 and 104 have camming portions, respectively, which include a pair of thrust transmitting link elements 107, 107' interposed between arm 103 and abutment portion 86 and a second pair of thrust transmitting link elements 108, 108' interposed between arm 104 and abutment portion 87. Arm 103 together with links 107, 107' and arm 104 together with links 108, 108' can also be defined as a pair of toggle joints interposed respectively between the link member 102 and abutment portions 86 and 87.

Link element 108 at one end is provided with a transverse bore and at the opposite end with a slot 111 extending toward the bore. It is apparent from Figs. 3 and 5 that the link elements 107, 107' and 108, 108' are of identical construction. Link elements 108, 108' are assembled, respectively, on opposite sides of the abutment portion 87 having their respective bores in alignment with the bores of the abutment portion 87 to receive a pivot pin 112 which carries washers 113, 113' at opposite ends thereof adjacent the link elements 108, 108' and being retained on pin 112 by cotter keys 114, 114'. The ends of links 108, 108' having open slots 111 are received at opposite sides of the arm 104, respectively, on a pin 116 which is piloted through the transverse bore of the arm 103 and are retained thereon by washers 117, 117' which are in turn retained by cotter keys 118, 118' respectively at opposite ends of the pin 116. Link elements 107, 107' are similarly assembled at abutment portion 86 on a pivot pin 119 and connected to arms 103 by pin 120. The joints, respectively, at pins 116 and 120 can be defined as lost motion connections since when arm 103 is pivoted upward, arm 104 moves downward and the pin 120 slides freely in slots 111 of links 107, 107' as is shown in Fig. 5. A pair of adjusting screws 121 and 122 having abutting ends 123 and 124 are received into threaded bores provided in the top of the support housing 47. Abutting ends 123, 124 are in confronting relationship respectively to the ends of the arms 103 and 104. The adjusting screws 121, 122 are respectively held in place by lock nuts 126, 127.

Referring to Fig. 6, a pair of spring and plunger housings 128, 129 are attached in opposed relation at opposite sides of the crank arm 96 on the outside of support housings 47 by cap screws 131. Housing 128 includes an assembly having a cylinder bore 132 in which is received a compressible spring 133 and a plunger 134 being urged by the spring into abutting relationship with the crank arm 96. Housing 129 includes a similar cylinder bore in which is received a spring loaded plunger 136 which abuts crank arm 96 oppositely of plunger 134.

In the neutral position, Figs. 3 and 6, the crank arm 96 is maintained in a vertical position by the plungers 134 and 136. The arms 103, 104 of the link member 102 are in thrust communication, respectively, with the abutment portions 86 and 87 through link elements 107, 107' and 108, 108' whereby the clutch shifting member 81 is adjusted centrally on the guide bar 79 which simultaneously maintains collar member 62 centrally on the splined portion 63 of output shaft 57 disengaged from both the forward gear 59 and the reverse gear 58. Should the crank arm 96 be rotated in either direction, one or the other of the plungers 134 or 136 would be forced down into respective cylinder bores compressing the corresponding spring which would be effective to bias the crank arm 96 toward the neutral position.

In the first near dead center position of arm 104 and links 108, 108', shown in Fig. 5, the hand lever 33 and crank arm 96 are rotated in a rearward direction, as viewed from the operator's station 13 (Fig. 1), thereby rotating pivot shaft 88 rearwardly. The arm 104 being keyed to shaft 88 is rotated downward until the end of arm 103 engages the abutting portion 123 of adjusting screw 121 preventing further rotation. The camming action of the end portion of the arm 104 as it rotates downward transmits thrust to the links 108, 108' which in turn act on the abutment portion 87 sliding the shifting member 81 axially rearward on the guide bar 79 thereby translating rotational motion into linear motion. The collar member 62 being engaged by the yoke 83 moves rearward simultaneously with the shifting member 81 to urge the clutch surfaces 71 and 72 into torque transmitting engagement with the clutch faces 73 and 74 thereby effectively connecting the reverse gear 58 to the output shaft 57 for rotation therewith. During engagement torque is being transmitted by the gear to the collar member at a tapered boundary between the meshed clutch surfaces and faces. The force acting at the tapered boundary to produce the torque has an axial component which tends to separate the meshed clutch jaws. Therefore after engagement for steady operation the back thrust, produced by the axial force component or separating force, must be resisted in order to prevent disengagement. The back thrust is transmitted by the collar member 62 to the shifting member 81 through yoke 83 and arm 82 and thence by abutting portion 87 along a thrust axis, shown in Fig. 5 by a dot dash line 125. The thrust passes through the center of pivot pin 112 to the links 108, 108' and through the center of pin 116. The thrust is then transmitted through the arm 104 and passes slightly above the center of the pivot shaft 88 thereby transmitting the major portion of the thrust into the support housing 47 rather than to the operator's hand lever 32.

Theoretically, the back thrust is totally resisted by the support housing when the thrust axis, which at all times passes through the center of pivot pin 112 and pin 116, also passes through the center of the pivot shaft 88. This position is a dead center position. In practice, however, the axis may pass slightly above or below the center of the pivot shaft 88 resulting in a force moment about the pivot shaft equal to the product of the back thrust being transmitted along the thrust axis and the moment arm or perpendicular distance from the thrust axis to the center of the pivot shaft 88. When the thrust axis passes above the center of pivot shaft 88, the resulting force moment tends to rotate the arm 104 upward. In order to prevent disengagement this force moment must be resisted by a counterforce applied by the operator through hand lever 32. Since the thrust axis at all times passes through pin 116, and has pivot pin 112 as a fulcrum, its path with respect to the center of pivot shaft 88 can be shifted by altering the vertical position of pin 116 which is carried by arm 104. This is readily accomplished by selectively regulating adjusting screw 121 whose end 123 abuts arm 103 thereby predetermining the position of arm 104 during engagement. The adjusting screw 121, by predetermining the position of the arm 104 provides an effective means for controlling the perpendicular distance between the path of the thrust axis and the center of the pivot shaft 88. Although the back thrust may be great, the moment arm, by proper regulation of adjusting screw 121, can be maintained infinitely small, whereby the resultant moment force to be resisted by the operator will be negligible.

The clutch shifting linkage is disposed in a second near dead center position when control lever 32 is moved in a rearward direction from the neutral position thereby rotating arm 103 downward, urging the clutch surfaces 66, 67 into torque transmitting engagement with the clutch faces of 68, 69 of the forward gear 59 and imparting a forward rotation to the output shaft. It is apparent from Figs. 3, 5 and 6 that the back thrust is resisted in the same manner as was hereinbefore described for the first near dead center position.

Shown in Fig. 4 is a modification of the invention which is similar to the preferred embodiment (shown in Fig. 5) the particular differences being: that the clutch shifting member 141 presents oppositely spaced abutment portions 142, 143 having transverse abutting surfaces 144, 146, respectively; and the arms 147, 148 of the link member 149 are similar to arms 103, 104 (shown in Figs. 3 and 5) but have camming portions including a pair of rollers 151, 151', respectively, on opposite lateral sides of the arm 147 adjacent the end thereof being rotatably mounted on suitable bearings on opposite ends of a pin 153 which is attached centrally in a transverse bore provided in the end of the arm 147 as by press fitting and a pair of rollers 152, 152' are mounted similarly on a pin 154 carried in a transverse bore adjacent the end of arm 148.

In the neutral position, the two pairs of rollers 151, 151' and 152, 152' are in thrust communication respectively with the abutment surfaces 144 and 146. In the first near dead center position the arm 148 pivots upward until it abuts the adjusting screw 121. The camming action of arm 147 as it is rotated downward transmits a thrust to the abutment surface 146 through rollers 151, 151' which are in rolling contact therewith, causing the clutch shifting member 141 to slide axially along the guide bar 79 and to simultaneously effect engagement between the clutch member 62 and the reverse gear 58 in the same manner as that described for the first near dead center position of the preferred embodiment (Fig. 5). The back thrust which results from the separating force between the respective clutch jaws is transmitted from the abutment portion 143 along a thrust axis originating at the point of contact between abutment surface 146 and rollers 151 and 151' and passes through the rollers along a radius thereof normal to surface 146 and thence to arm 147 through the center of pivot pin 153 and thence to the support housing 47 passing through pivot shaft 88 near center. Here, as was previously described in connection with the preferred embodiment, adjusting screw 121 is effectively employed to adjust the path of the thrust axis with respect to the center of pivot shaft 88 by controlling the position of arm 148.

In a second near dead center position engagement is established with the forward gear in the same manner as that described for the first near dead center position, the arm 148 being effectively interposed between the abutment portion 142 and the support housing 46 to transmit thrust along a thrust axis passing through the center of pivot pin 154 and near the center of the pivot shaft 88.

It is desirable in each embodiment to have the path of the thrust axis pass slightly above the center of pivot shaft 88 thereby providing the operator with a "feel" due to the small resultant force moment which must be resisted by hand. The feature of "feel" is of particular advantage when controlling an adjustable mechanism having stops which limit travel in either direction.

When the adjustable mechanism reaches the end of its travel, rotation of the output shaft 57 is resisted thereby imposing a sudden torsional loading on the shaft which simultaneously increases the back thrust causing a force moment which will be sensed by the operator and allow him to disengage the clutch member by allowing the hand lever 32 to return to the neutral position. The adjusting screws 121 and 122 in regulating the amount of manual resistance which is required to prevent disengagement of the clutch are also effective to compensate for manufacturing variation permitting complete interchangeability of parts and also to maintain proper adjustment even though the parts become worn.

It is to be understood that although the structure which is shown in Figs. 4, 5, 6 and described herein is for one of the control stations 33, each of the other five stations of the power control device shown in Figs. 2 and 7 are of similar construction and operate in the same manner.

It should be understood further that the particular forms and details described herein illustrated only two embodiments of the invention and that it is not intended to limit the patent granted hereon otherwise than is necessitated by the scope of the appended claims.

What is claimed is:

1. In a power control device for transmitting mechanical power to operate tool or wheel adjusting mechanisms on a self-propelled earth working vehicle, the combination comprising: a support housing; an input shaft; an output shaft; a forward and reverse gearing operatively interposed between said output and input shaft; a clutch member mounted on said output shaft for rotation therewith and for selectively establishing a forward or reverse drive between said input and output shafts; a clutch shifting structure slidably mounted on said support housing and presenting spaced abutment portions for receiving and transmitting thrust; means presented by said shifting structure for urging said clutch member into and out of torque transmitting engagement with said forward and reverse gearing; and a manually actuated control lever mounted on said support housing for pivoting about an axis and having a pair of arms extending radially from said axis; and thrust transmitting means operatively interposed between said arms and said abutment portions for transmitting thrust therebetween, one of said arms being disposed in a near dead center position when said control lever is pivoted so as to move said clutch member into engagement with said forward or reverse gearing.

2. In a power control device for transmitting mechanical power to operate tool or wheel adjusting mechanisms on a self-propelled earth working vehicle, the combination comprising: a support housing; an input shaft; an output shaft; a forward and reverse gearing operatively interposed between said input and output shafts; a clutch member slidably mounted on said output shaft for rotation therewith and for selectively establishing forward and reverse driving connections between said input and output shafts; a clutch shifting structure slidably mounted on said support housing and presenting spaced abutment portions for receiving and transmitting thrust; means presented by said shifting structure for urging said clutch member into and out of torque transmitting engagement with said forward and reverse gearing; and a manually actuated control lever mounted on said support housing for pivoting about an axis and having a pair of arms extending radially from said axis; thrust transmitting means operatively interposed between said arms and abutment portions for transmitting thrust therebetween, said control lever being pivotable in one direction into a first near dead center position and pivotable in an opposite direction into a second near dead center position, said clutch member being engaged with said reverse gearing in said first position and with said forward gearing in said second position.

3. In an engine driven earth working vehicle having a control device for transmitting torque from the engine to mechanically adjusted mechanisms carried by said vehicle wherein said control device includes a support housing, input and output shafts, forward and reverse gearing interposed between said input and output shafts including a forward gear and a reverse gear rotatably mounted in spaced relation on said output shaft, clutch faces presented, respectively, by said forward and reverse gears, and a collar member slidably mounted on said output shaft for rotation therewith and having clutch surfaces in confronting relation, respectively, to said faces, a clutch shifting structure for said control device comprising: a clutch shifting member slidably mounted on said support housing and having means for urging said surfaces into and out of torque transmitting engagement with said faces; a pair of spaced abutment portions presented by said clutch shifting member for receiving and transmitting thrust; a manually actuated control lever mounted on said support housing for pivoting about an axis and having a pair of arms extending radially from said axis in confronting relationship, respectively, with said abutment portions; and a pair of thrust transmitting elements operatively interposed between said arms and said abutment portions, said lever being pivotable in one direction into a first near dead center position and pivotable in the opposite direction into a second near dead center position, one of said surfaces being engaged with said face on said reverse gear in said first position and the other of said surfaces being engaged with said face on said forward gear in said second position.

4. In an engine driven earth working vehicle having a control device for transmitting torque from the engine to mechanically adjusted mechanisms carried by said vehicle wherein said control device includes a support member, input and output shafts; a forward and a reverse gearing interposed between said input and said output shafts having a forward gear and a reverse gear rotatably mounted on the axis of said output shaft, clutch faces presented respectively by said forward and reverse gears; and a collar member slidably mounted on said output shaft for rotation therewith and having clutch surfaces in confronting relation respectively to said faces; a clutch shifting structure for said control device comprising: a clutch shifting member slidably mounted on said support member along an axis parallel to the axis of said output shaft, said clutch shifting member having a portion thereof in thrust transmitting engagement with said collar member; a pair of spaced abutment portions forming on one of said clutch shifting or support members; a manually actuated control lever having spaced cam portions in thrust communicating relationship, respectively, with said abutment portions; and means pivotally mounting said control lever on the other of said clutch shifting or support members intermediate said cam portions for pivotal movement in one direction into a first near dead center position and for pivotal movement in an opposite direction into a second near dead center position, one of said surfaces being engaged with said face on said reverse gear in said first position and the other of said surfaces being engaged with said face on said forward gear in said second position.

5. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on said output shaft, clutch faces presented, respectively, by said forward and reverse gears, and a collar member slidably mounted on said output shaft for rotation therewith and having clutch surfaces in confronting relation respectively to said faces, a clutch shifting structure for said control device comprising: a clutch shifting member slidably mounted on said support housing and having means for urging said surfaces into and out of torque transmitting engagement with said faces; a pair of spaced abutment portions presented by said clutch shifting member for receiving and transmitting thrust; and a manually actuated control lever having spaced cam portions in thrust communication, respectively, with said abutment portions, said control lever being pivotally mounted on said support housing intermediate said cam portions and being pivoted in one direction into a first near dead center position and in the opposite direction into a second near dead center position, said surfaces being engaged with said faces on said reverse gear in said first position and the other of said surfaces being engaged with said faces on the said forward gear in said second position.

6. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on the axis of said output shaft, clutch faces presented respectively by said forward and reverse gears; and a collar member slidably mounted on said output shaft for rotation therewith and having clutch surfaces in confronting relation respectively to said faces, and a clutch shifting structure for said control device comprising: a clutch shifting member slidably mounted on said support housing and having means for urging said surfaces into and out of torque transmitting engagement with said faces; a pair of spaced abutment portions presented by said clutch shifting member for receiving and transmitting thrust; a manually actuated control lever mounted on said support housing for pivoting about an axis and having a pair of arms extending radially from said axis in confronting relationship, respectively, with said abutment portions; and a pair of roller members rotatably mounted respectively on said arms for transmitting thrust between said arms and said abutting portions, said control lever being pivoted in one direction for engaging one of said surfaces with said face on said forward gear and in an opposite direction for engaging the other of said surfaces with said face on said reverse gear and when pivoted in either direction one or the other of said arms being disposed in a near dead center position.

7. In an engine driven earth working vehicle having a control device for transmitting torque from said engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on the axis of said output shaft, clutch faces presented respectively by said forward and reverse gears; and a collar member slidably mounted on said output shaft for rotation therewith and having clutch surfaces in confronting relation respectively to said faces, a clutch shifting structure for said control device comprising: a clutch shifting member slidably mounted on said support housing on an axis parallel to said axis of said output shaft, said clutch shifting member having a portion in axial thrust transmitting relation to said clutch member and a pair of spaced abutment portions; a manually actuated control lever having spaced cam portions in thrust communicating relationship, respectively, with said abutment portions; and means pivotally mounting said control lever on said support housing intermediate said cam portions for pivotal movement in one direction into a first near dead center position and in an opposite direction into a second near dead center position, one of said surfaces being engaged with said face on said reverse gear in said first position and the other of said surfaces being engaged with said face on said forward gear in said second position.

8. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a guide bar mounted on said support housing parallel to said output shaft, a clutch shifting member slidably mounted on said bar, said clutch shifting member having a portion in axial thrust transmitting relation to said collar member and a pair of spaced abutment portions for receiving or transmitting thrust; a manually actuated control lever mounted on said support housing for pivoting about an axis normal to said guide bar and having a pair of arms extending radially from said axis in confronting relationship respectively to said abutment portions; and a pair of roller members rotatably mounted respectively on said arms for thrust communication with said abutment portions, said control lever being pivoted in one direction for engaging one of said surfaces with said forward gear and when pivoted in an opposite direction the other of said surfaces being engaged with said face of said reverse gear and when pivoted in either direction one or the other of said arms being disposed in a near dead center position.

9. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation respectively to said faces, a clutch shifting structure for said control device comprising: a clutch shifting member slidably mounted on said support housing on an axis parallel to said axis of said output shaft, said clutch shifting member having a portion in axial thrust transmitting relation to said collar member and a pair of spaced abutment portions for receiving or transmitting thrust; a manually actuated control lever having spaced cam portions in thrust communicating relationship, respectively, with said abutment portions; means pivotally mounting said control lever on said support housing intermediate said cam portions for pivotal movement in opposite directions from a neutral position to first and second near dead center positions, respectively, one of said surfaces being engaged with said face on said reverse gear in said first position and the other of said surfaces being engaged with said face on said forward gear in said second position and both said surfaces being disengaged in said neutral position; and means biasing said control lever toward said neutral position.

10. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears;

and a collar member slidably mounted on said output shaft for rotation therewith and having clutch surfaces in confronting relation respectively to said faces, a clutch shifting structure for said control device comprising: a guide bar rigidly mounted on said support housing parallel to said output shaft, a clutch shifting member slidably mounted on said support shaft, said clutch shifting member having a portion in axial thrust transmitting relation to said collar member and a pair of spaced abutment portions for receiving or transmitting thrust; a manually actuated control lever mounted on said support housing for pivoting about an axis normal to said guide bar and having a pair of arms extending radially from said axis in confronting relationship respectively to said abutment portions; a pair of roller members rotatably mounted respectively on said arms for thrust communication with said abutment portions, said control lever having first and second near dead center positions and a neutral position, and being pivoted in one direction into said first position and pivoted in the opposite direction into said second position, one of said surfaces being engaged with said face on said reverse gear in said first position, the other of said surfaces being engaged with said face of said forward gear in said second position and said surfaces being disengaged in said neutral position, and means biasing said control lever toward said neutral position.

11. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation respectively to said faces, a clutch shifting structure for said control device comprising: a clutch shifting member slidably mounted on said support housing having a pair of spaced portions and having a portion in axial thrust transmitting relation to said collar member; a manually actuated control lever; means for pivotally mounting said lever on said support housing intermediate said spaced portions; and toggle joints operatively interposed, respectively, between said lever and said spaced portions, said lever being operable when pivoted in one direction to move one of said toggle joints into a first near dead center position and being operable when pivoted in the opposite direction to move the other of said toggle joints into a second near dead center position, one of said surfaces being engaged with said reverse gear in said first position and the other of said surfaces being engaged with said face of said forward gear in said second position.

12. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a guide bar mounted on said support housing parallel to said output shaft, a clutch shifting member slidably mounted on said guide bar, said clutch shifting member having a pair of spaced portions and having a portion in axial thrust transmitting relation to said collar member; a manually actuated control lever; means pivotally mounting said lever on said support housing intermediate said spaced portions; and a pair of toggle joints operatively interposed, respectively, between said lever and said spaced portions, said lever being operable when pivoted in one direction to move one of said toggle joints into a first near dead center position and being operable when pivoted in the opposite direction to move the other of said toggle joints into a second near dead center position, one of said surfaces being engaged with said face of said reverse gear in said first position and the other of said surfaces being engaged with said face of said forward gear in said second position.

13. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a clutch shifting member mounted on said support housing and slidable on an axis parallel to said axis of said output shaft, said clutch shifting member having a pair of spaced portions and having a portion in axial thrust transmitting relation to said clutch member; pivot means pivotally connecting said lever on said support housing intermediate said spaced portions; a pair of arms presented by said lever extending radially from said pivot means in confronting relationship, respectively, with said spaced portions; and a pair of thrust transmitting links pivotally interconnecting said arms respectively with said spaced portions, said lever being pivoted in one direction into a first near dead center position and pivoted in the opposite direction into a second near dead center position, said clutch member being engaged with said reverse gear in said first position and with said forward gear in said second position.

14. In an engine driven earth working vehicle having a control device for transmitting torque from the engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a guide bar mounted on said support housing parallel to said output shaft, a clutch shifting member slidably mounted on said guide bar, said clutch shifting member having a portion in axial thrust transmitting relation to said collar member and having a pair of spaced abutment portions; a manually actuated control lever mounted on said support housing for pivoting about a pivot axis normal to the axis of said guide bar and having a pair of arms extending radially from said pivot axis in confronting relationship respectively to said abutment portions; and a pair of thrust transmitting link elements interconnecting each of said arms respectively with said abutment portions, one of the ends of each of said link elements being slotted permitting a lost motion connection and the opposite end providing a pivoted connection, said control lever being pivoted in one direction into a first near dead center position and when pivoted in the opposite direction into a second near dead center position, one of said surfaces being engaged with said reverse face in said first position and the other of said surfaces being engaged with the face of said forward gear in said second position.

15. In an engine driven earth working vehicle having a control device for transmitting torque from said engine to mechanically adjusted mechanisms carried by said vehicle wherein said control device includes a support housing, input and output shafts; a forward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation to said faces; and a clutch shifting structure for said control device comprising: a clutch shifting member slidably mounted on said support housing on an axis parallel to the axis of said output shaft, said clutch shifting member having a pair of spaced abutment portions and having a portion in axial thrust transmitting relation to said collar member; a manually actuated control lever; means connecting said control lever on said support housing intermediate said abutment portions for movement about a pivot axis normal to said output shaft; a pair of toggle joints operatively interposed between said control lever at opposite sides of said pivot axis respectively and said abutment portions, said control lever being pivotable in opposite directions from a neutral position to first and second near dead center positions respectively, one of said surfaces being engaged with said face of said reverse gear in said first position and the other of said surfaces being engaged with said face of said forward gear in said second position and said surfaces and faces being disengaged in said neutral position; and means biasing said control lever toward said neutral position.

16. In an engine driven earth working vehicle having a control device for transmitting torque from said engine to mechanically adjusted mechanisms carried by said vehicle wherein said control device includes a support housing, input and output shafts; a foward and a reverse gearing interposed between said input and said output shafts having a forward gear and a reverse gear rotatably mounted on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a guide bar mounted on said support housing parallel to said output shaft, a clutch shifting member slidably mounted on said guide bar, said clutch shifting member having a portion in axial thrust transmitting relation to said collar member and having a pair of spaced abutment portions for receiving or transmitting thrust; a manually actuated control lever mounted on said support housing for pivoting about an axis normal to said support shaft and having a pair of arms extending radially from said axis in confronting relationship respectively to said abutment portions; a pair of thrust transmitting links operatively interposed respectively between said arms and said abutment portions being connected pivotally on said abutment portions and by a lost motion connection on said arms, said control lever being pivotable in opposite directions from a neutral position into first and second near dead center positions respectively, said surfaces being engaged with said face of said reverse gear in said first position, the other of said surfaces being engaged with said face of said forward gear in said second position and both said surfaces being disengaged in said neutral position, and means biasing said control lever toward said neutral position.

17. In an engine driven earth working vehicle having a control device for transmitting torque from said engine to mechanically adjusted mechanisms carried by said vehicle wherein said control device includes a support housing, input and output shafts; a forward and a reverse gearing interposed between said input and said output shafts having a forward gear and a reverse gear rotatably mounted in spaced relation on the axis of said output shaft, clutch faces respectively presented by said forward and reverse gears; and a collar member slidably mounted on said output shaft for rotation therewith and having clutch surfaces in confronting relation to said faces, a clutch shifting structure for said control device comprising: a guide bar rigidly mounted on said support housing parallel to said output shaft, a clutch shifting member slidably mounted on said guide bar, said clutch shifting member having a pair of spaced abutment portions and having a portion in axial thrust transmitting relation to said collar member; a manually actuated control lever; pivot means intermediate said abutment portions for mounting said lever on said support housing and permitting pivotal movement about an axis normal to said support shaft, said lever having a pair of arms extending radially from said pivot axis in confronting relationship respectively to said abutment portions; a pair of thrust transmitting links respectively interconnecting said arms and abutment portions, one end of said links being pivotally connected respectively to said abutment portions and the opposite ends having slots therein being pinned respectively on said arms, said control lever being pivotable in opposite directions from a neutral position into first and second near dead center positions, one of said surfaces being engaged with said face of said forward gear in said first position and the other of said surfaces being engaged with said face of said reverse gear in said second position and both said surfaces being disengaged in said neutral position, and means biasing said control lever toward said neutral position.

References Cited in the file of this patent

UNITED STATES PATENTS

| | | |
|---|---|---|
| 1,948,068 | File | Feb. 20, 1934 |
| 1,961,340 | Crawford | June 5, 1934 |
| 2,175,383 | Eason | Oct. 10, 1939 |